US010225237B2

(12) United States Patent
Singh

(10) Patent No.: US 10,225,237 B2
(45) Date of Patent: Mar. 5, 2019

(54) SYSTEMS AND METHODS FOR IMPROVING HTTPS SECURITY

(71) Applicant: Zscaler, Inc., San Jose, CA (US)

(72) Inventor: Ajit Singh, San Jose, CA (US)

(73) Assignee: Zscaler, Inc., San Jose, CA (US)

(*) Notice: Subject to any disclaimer, the term of this patent is extended or adjusted under 35 U.S.C. 154(b) by 164 days.

(21) Appl. No.: 15/295,054

(22) Filed: Oct. 17, 2016

(65) Prior Publication Data

US 2018/0109498 A1    Apr. 19, 2018

(51) Int. Cl.
    H04L 29/06    (2006.01)
    H04L 29/08    (2006.01)
    H04L 29/12    (2006.01)
(52) U.S. Cl.
    CPC ........ H04L 63/0281 (2013.01); H04L 63/101 (2013.01); H04L 63/168 (2013.01); H04L 67/02 (2013.01); H04L 67/10 (2013.01); H04L 67/42 (2013.01); *H04L 61/1511* (2013.01)
(58) Field of Classification Search
    CPC ............. H04L 63/0281; H04L 63/0428; H04L 63/101; H04L 63/1475; H04L 67/02; H04L 67/10; H04L 67/42; H04L 61/1511; H04L 9/32
    USPC .................... 726/4, 11, 12, 13, 14; 713/162; 709/227, 230
    See application file for complete search history.

(56) References Cited

U.S. PATENT DOCUMENTS

| 7,609,721 | B2 * | 10/2009 | Rao ..................... H04L 1/1854 370/470 |
| 8,230,506 | B1 | 7/2012 | Forristal |
| 8,261,057 | B2 * | 9/2012 | Sundarrajan ........ H04L 63/0272 713/151 |
| 8,683,193 | B1 * | 3/2014 | Hansen .................. H04L 29/06 713/153 |
| 8,793,488 | B1 | 7/2014 | Forristal |
| 8,799,482 | B1 * | 8/2014 | Stamos .............. H04L 29/0809 709/227 |
| 9,083,727 | B1 * | 7/2015 | Stamos ................ H04L 63/126 |
| 9,154,475 | B1 | 10/2015 | Kailash et al. |
| 9,450,838 | B2 | 9/2016 | Jain et al. |
| 2009/0158418 | A1 * | 6/2009 | Rao ..................... H04L 63/0272 726/12 |

(Continued)

OTHER PUBLICATIONS

J. Hodges, C. Jackson, A. Barth "HTTP Stric Transport Security (HSTS)" Nov. 2012, Google Inc, ISSN 2070-1721.*

(Continued)

*Primary Examiner* — Saleh Najjar
*Assistant Examiner* — Khalid M Almaghayreh
(74) *Attorney, Agent, or Firm* — Clements Bernard Walker PLLC; Lawrence A. Baratta, Jr.

(57) ABSTRACT

Systems and methods for HyperText Transfer Protocol (HTTP) HTTP Strict Transport Security (HSTS), are implemented by one or more servers associated with a gateway in a cloud based proxy. A method includes managing a preloaded list of HTTP Security (HTTPS) support of a plurality of domains; receiving a domain request from an HSTS application executed on a user device, wherein the HSTS application is configured to detect the domain request from a browser or application executed on the user device; and transmitting a response to the user device with header information related to support of HTTPS the domain.

20 Claims, 13 Drawing Sheets

(56) References Cited

U.S. PATENT DOCUMENTS

| | | |
|---|---|---|
| 2010/0024006 A1 | 1/2010 | Kailash et al. |
| 2012/0016931 A1 | 1/2012 | Singh et al. |
| 2015/0244741 A1 | 8/2015 | Sinha et al. |
| 2016/0269447 A1 | 9/2016 | Kailash et al. |
| 2017/0171247 A1* | 6/2017 | Sullivan .................. H04L 63/20 |

OTHER PUBLICATIONS

Sivakorn et al., HTTP Cookie Hijacking in the Wild: Security and Privacy Implications; black hat USA 2016, Jul. 30-Aug. 4, 2016, Mandalay Bay, Las Vegas, pp. 1-44.

Hodges, et al., HTTP Strict Transport Security (HSTS), Internet Engineering Task Force (IETF), Internet Standards Track document, ISSN: 2070-1721, Nov. 2012, pp. 1-46.

* cited by examiner

US 10,225,237 B2

SYSTEMS AND METHODS FOR IMPROVING HTTPS SECURITY

FIELD OF THE DISCLOSURE

The present disclosure generally relates to computer networking systems and methods. More particularly, the present disclosure relates to systems and methods for improving Hypertext Transfer Protocol (HTTP) Secure (HTTPS).

BACKGROUND OF THE DISCLOSURE

Eavesdroppers have always been successful in stealing private and confidential information until extensive usage of HTTPS. Using HTTPS solved the problem by encrypting data before sending it over a network. Due to human habit, a user typically types the domain name in browser address bar for an initial request (e.g., http://domain). Then browser makes the initial request to http://domain. If the domain supports HTTPS, it redirects to https://domain. After this redirection, data is encrypted before sending over the network. Before this redirection, the connection is not encrypted, and the browser sends all HTTP header data as plain text.

Disadvantageously, an eavesdropper can steal data from the initial request before redirection to HTTPS. The kind of data present in the first HTTP initial request can include Cookies, User-Agent and Server Authentication Credentials, and the like. Cookies are extensively used to authenticate a user, store ads data, identification of the device and many more purposes. User-Agent information includes browser details, browser version, and Operating System (OS) information. User-Agent information can be used to devise an attack to the user machine with known and exposed issues with browser and OS and also zero-day attacks.

Many servers use the HTTP WWW-Authenticate mechanism to perform user authentication. Once the browser authenticates with the server, it caches the authentication and uses it for a subsequent request. The first initial request before the redirecting to HTTPS will include this information as well. Authorization header information can be exploited to attack server and user both. Many browsers have started preloading the list of domains that support HTTPS. As soon as a user types the domain in a browser address bar, the domain is replaced with https://domain, which makes the initial connection encrypted. This is referred to as HTTP Strict Transport Security (HSTS).

There are various problems with this approach. First, not all browsers or applications support HSTS. Second, the browser or application needs to store preloaded list on the user device, resulting in unnecessary memory utilization. Third, the browser or application does not have all domains in the preloaded list, e.g., domains are constantly being added to the Internet. Fourth, continuous browser or application updates are needed to push the preloaded list to billions or more user devices which are too intrusive. Fifth, by nature, the preloaded list is created by humans and prone to human error. Specifically, once an erroneous domain list is a push to the browser or application, it becomes a tedious, marathon task to fix.

A new more robust, less intrusive, manageable, and real-time solution is needed.

BRIEF SUMMARY OF THE DISCLOSURE

In an exemplary embodiment, a method for HyperText Transfer Protocol (HTTP) HTTP Strict Transport (HSTS), implemented by one or more servers associated with a gateway in a cloud based proxy, includes managing a preloaded list of HTTP Security (HTTPS) support of a plurality of domains; receiving a domain request from an HSTS application executed on a user device, wherein the HSTS application is configured to detect the domain request from a browser or application executed on the user device; and transmitting a response to the user device with header information related to support of HTTPS the domain. The method can further include, subsequent to the receiving and prior to the transmitting, determining the support of HTTPS of the domain. The determining can include sending a request to the domain without sensitive information from the domain request; and receiving a redirect from the domain. The determining can include checking the preloaded list and wherein the header information can include any exceptions based on the preloaded list. The HSTS application removes sensitive information from the domain request prior to the receiving. Communications between the user device and the gateway are secure. The domain may not support HSTS, and the method can further include transmitting the domain request with sensitive information in plain text between the gateway and the domain.

In another exemplary embodiment, a gateway in a cloud based proxy, configured to implement HyperText Transfer Protocol (HTTP) HTTP Strict Transport (HSTS), includes a network interface, a data store, and a processor communicatively coupled to one another; and memory storing computer executable instructions, and in response to execution by the processor, the computer-executable instructions cause the processor to perform steps of managing a preloaded list of HTTP Security (HTTPS) support of a plurality of domains; receiving a domain request from an HSTS application executed on a user device, wherein the HSTS application is configured to detect the domain request from a browser or application executed on the user device; and transmitting a response to the user device with header information related to support of HTTPS the domain. The memory storing computer executable instructions, and in response to execution by the processor, the computer-executable instructions can further cause the processor to perform steps of, subsequent to the receiving and prior to the transmitting, determining the support of HTTPS of the domain. The determining can include sending a request to the domain without sensitive information from the domain request; and receiving a redirect from the domain. The determining can include checking the preloaded list and wherein the header information can include any exceptions based on the preloaded list. The HSTS application removes sensitive information from the domain request prior to the receiving. Communications between the user device and the gateway are secure. The domain may not support HSTS, and wherein the memory storing computer executable instructions, and in response to execution by the processor, the computer-executable instructions can further cause the processor to perform steps of transmitting the domain request with sensitive information in plain text between the gateway and the domain.

In a further exemplary embodiment, a method for HyperText Transfer Protocol (HTTP) HTTP Strict Transport (HSTS), implemented by a user device in communication with a gateway in a cloud based proxy, includes detecting a domain request from a browser or application executed on the user device by an HSTS application on the user device; securely forwarding the domain request to a gateway; receiving a response from the gateway with header information related to HTTP Security (HTTPS) support of the domain; and, responsive to the domain supporting HTTPS based on the header information, securely communicating with the domain. The browser or application may not support HSTS. The HSTS application removes sensitive information from the domain request prior to the forwarding. The gateway determines whether the domain supports HTTPS independent of the user device. The gateway can determine HTTPS support through a request sent to the domain without sensitive information from the domain request; and reception of a redirect from the domain. The gateway can determine HTTPS support by checking a preloaded list managed thereon of HTTPS supporting domains and wherein the header information can include any exceptions based on the preloaded list.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to systems and methods for improving Hypertext Transfer Protocol (HTTP) Secure (HTTPS). Specifically, the systems and methods solve the deficiencies described herein related to HSTS using a cloud based proxy. In an exemplary embodiment, a cloud based security system is used as the cloud based proxy. A user device can be configured to forward traffic through the cloud based proxy. For example, the user device can include client software executed thereon, to forward traffic such as HTTP traffic to the cloud based proxy. Internet access is controlled by the user device which makes a CONNECT request for a domain, and the CONNECT request is through the cloud based proxy. The cloud based proxy replies with a custom header informing the user device whether the domain supports HTTPS. If the domain supports HTTPS, the user device removes a cookie header, a user-agent header, and/or an authorization header from the first request. The domain server then will redirect to HTTPS and the connection will be fully secure. All information will remain hidden from any eavesdroppers. If the domain does not support HTTPS, it can open a secure and encrypted connection to the cloud based proxy, e.g., to a gateway, to forward that domain request to provide partial protection (between the user device and the cloud based proxy). The cloud based proxy can protect user confidentiality information against any eavesdropper.

The cloud based proxy-based HSTS not only supports HSTS with enhanced security, but also overcomes the aforementioned deficiencies of the traditional browser-based approach. Advantageously, the preloaded list is not required on the user device; the cloud based proxy maintains such lists in a unified manner. Accordingly, any new or updated domain supporting HTTPS can be updated instantly, in real-time, in the cloud based proxy alleviating any client updates. Thus, any human error can be corrected without introducing any delay. Further, the cloud based proxy can automatically detect any domains supporting HTTPS to avoid any human population of the preloaded list. Also, HSTS support is provided for all browsers and applications regardless of version, vendor, and actual HSTS support thereon. Further, non-HSTS domains can also be secured via encrypted communication between the user device and the cloud based proxy. The systems and methods improve latency associated with fully encrypted tunnel protocols such as Internet Protocol Security (IPSec), avoids double encryption for HSTS supporting domains which is currently present in protocols such as IPSec, improves battery performance of the user device by reducing encryption processing thereon.

§ 1.0 Example High-Level System Architecture—Cloud-based Security System

Figure 1:
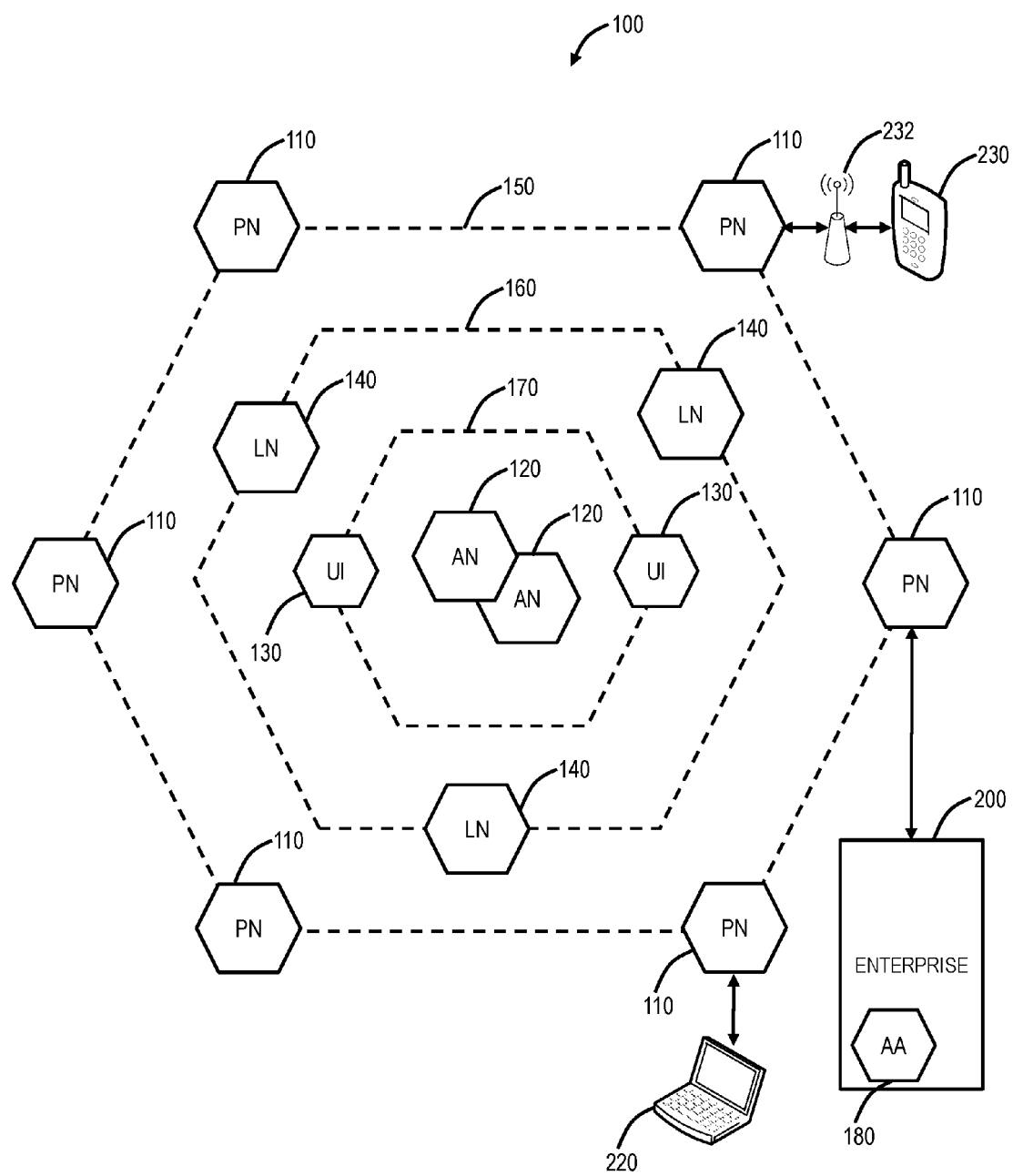
FIG. 1 is a network diagram of a distributed security system.

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, Data Leakage Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
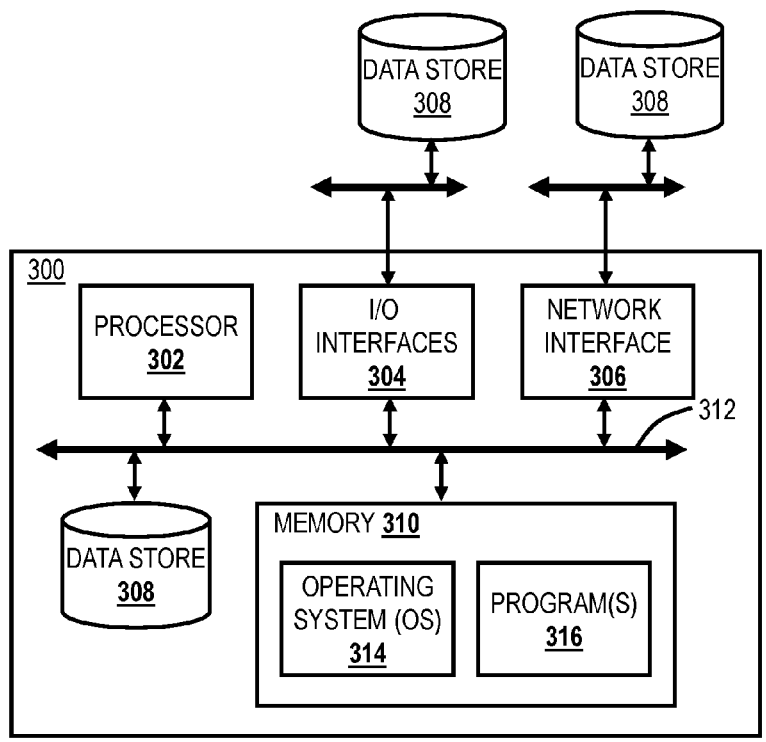
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain websites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise, the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the tracking and auditing systems and methods contemplate operation on any cloud-based system.

§ 2.0 Example Detailed System Architecture and Operation

Figure 2:
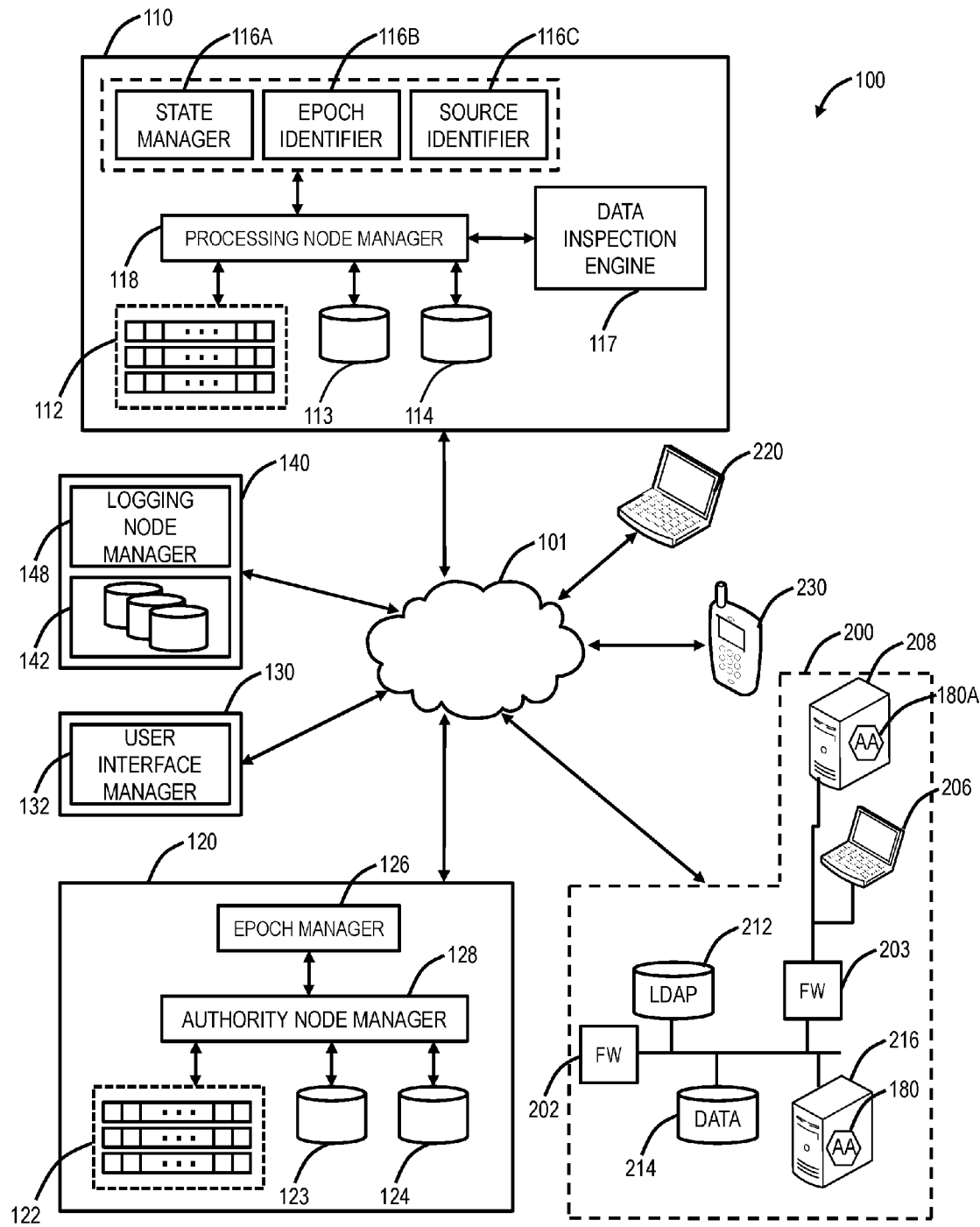
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180A may be included on a client computer 206. The client access agent 180A may, for example, facilitate security processing by providing a hash index of files on the user computer 206 to a processing node 110 for malware, virus detection, etc. Other security operations may also be facilitated by the access agent 180A. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180*b*. The computer device 220 and the mobile device 230 may also store information warranting security measures, such as personal bank records, medical information, and login information, e.g., login information to the computers 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secure data provider server.

§ 2.1 Example Processing Node Architecture

In an exemplary embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§ 3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Exemplary Mobile Device Architecture

Figure 4:
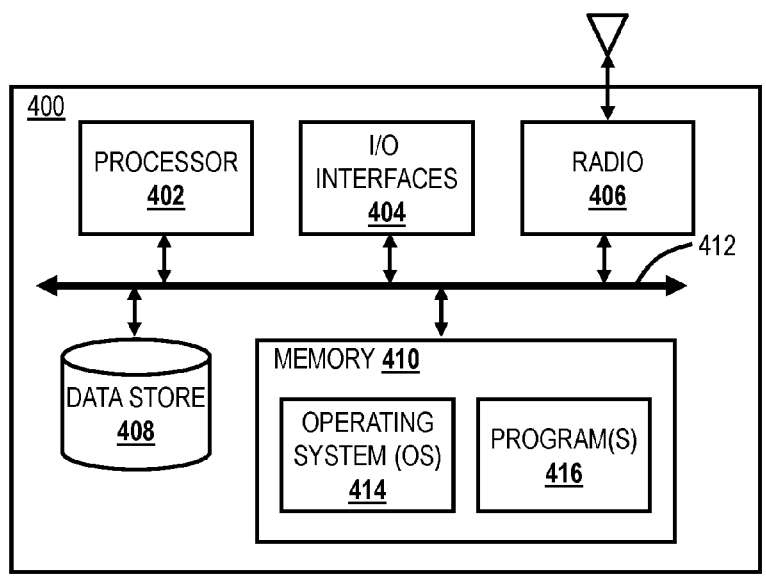
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); BLUETOOTH® (and other wireless communications, such as those falling within the IEEE 802.15.1 protocol); ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g., 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Exemplary General Cloud System

Figure 5:
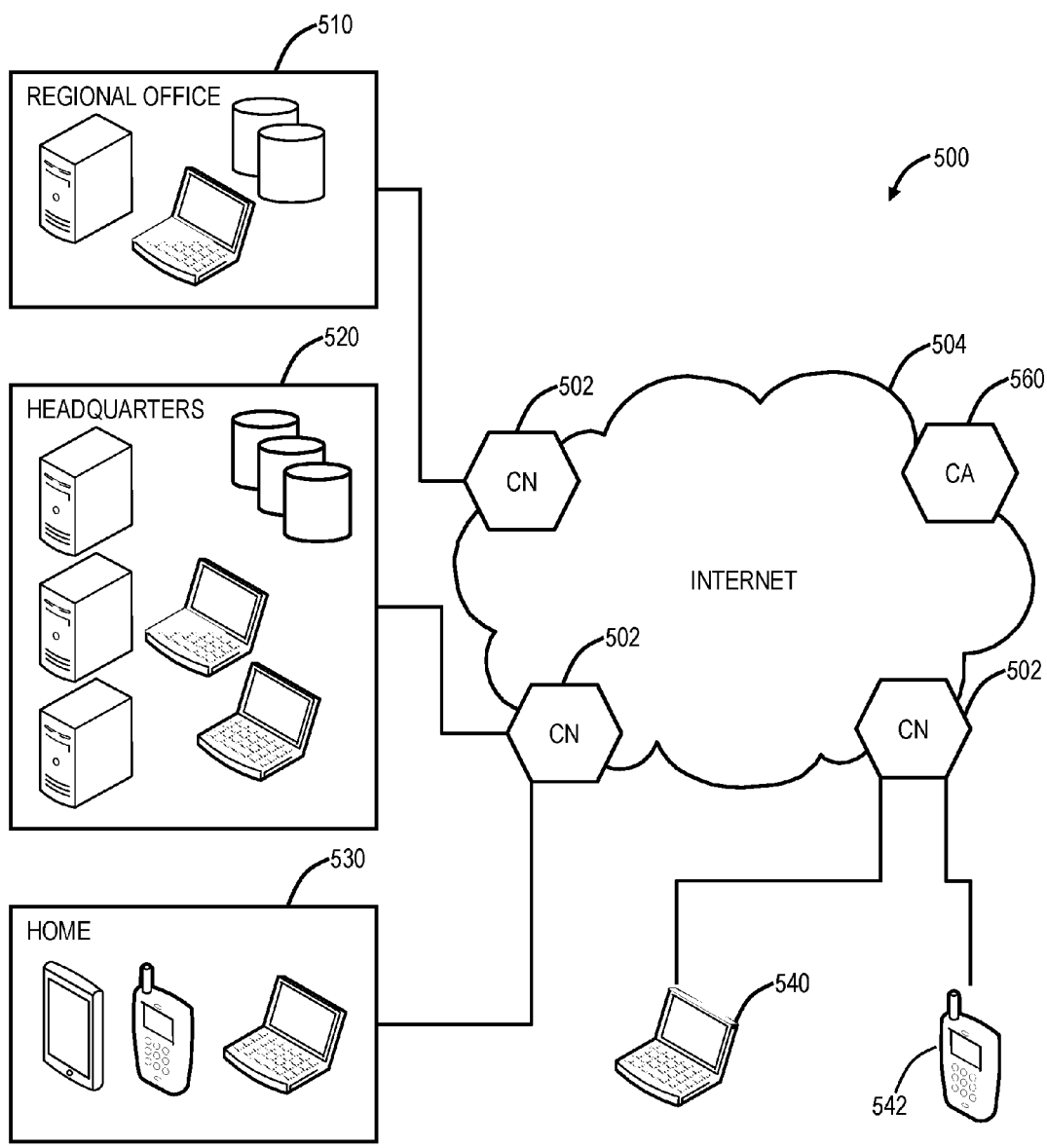
FIG. 5 is a network diagram of a generalized cloud-based system.

Referring to FIG. 5, in an exemplary embodiment, a cloud system 500 is illustrated for implementing the systems and methods described herein for tracking and auditing changes in a multi-tenant cloud system. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud-based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an exemplary embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an exemplary embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

§ 6.0 DNS Augmented Security

In an exemplary embodiment, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 502 are in the data path of connecting users. Another approach can include a passive approach to the data path. DNS is one of the most fundamental IP protocols. With DNS surrogation as a technique, it is proposed to use DNS for dynamic routing of traffic, per-user authentication and policy enforcement, and the like.

In conjunction with the cloud system 500 and/or the distributed security system 100, various techniques can be used for monitoring which is described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
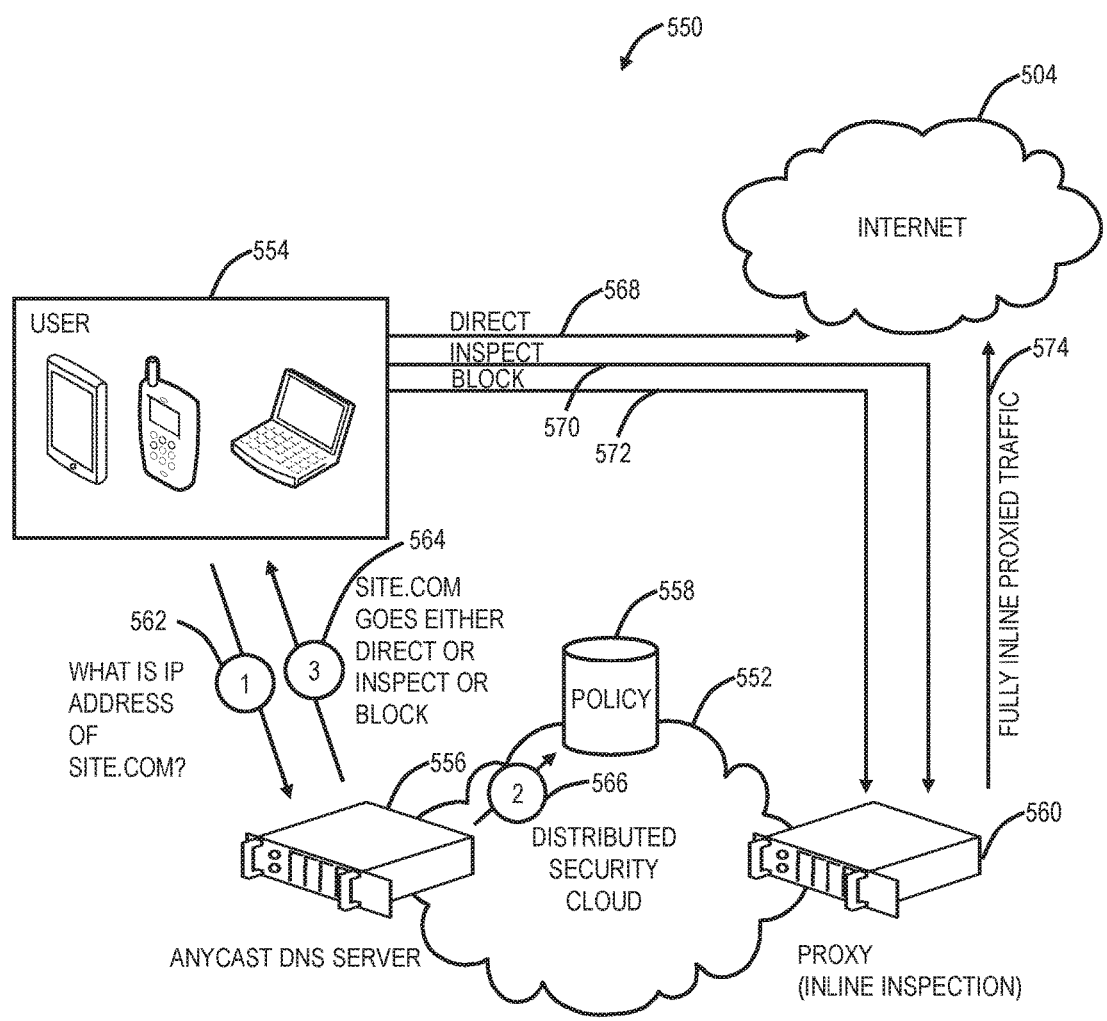
FIG. 6 is a network diagram of a network with a distributed security cloud providing DNS augmented security.

Referring to FIG. 6, in an exemplary embodiment, a network diagram illustrates a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully in line proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§ 7.0 HSTS Security

Figure 7:
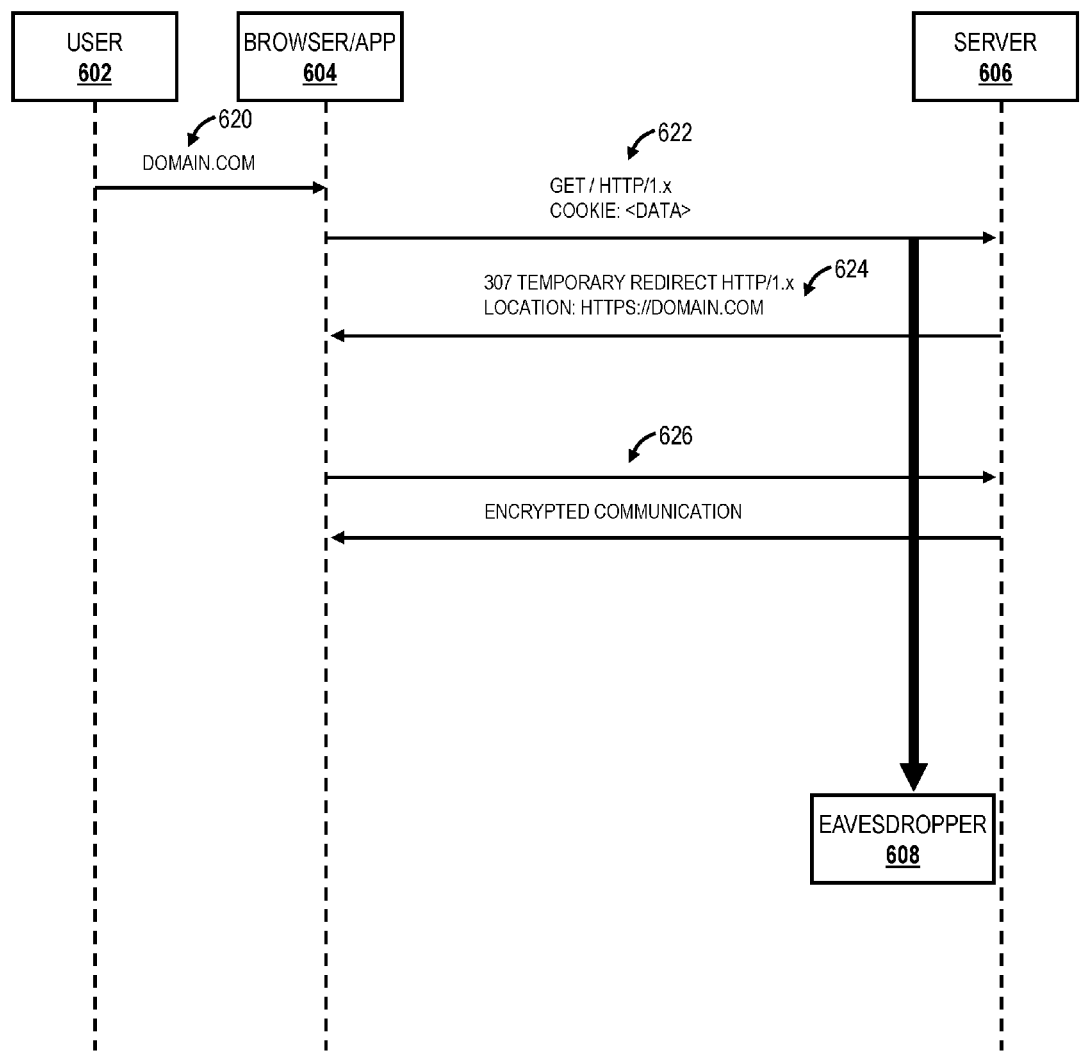
FIG. 7 is a network diagram of interactions between a user device, a browser/app on the user device, and a server associated with a requested domain illustrating cookie hijacking.
Figure 8:
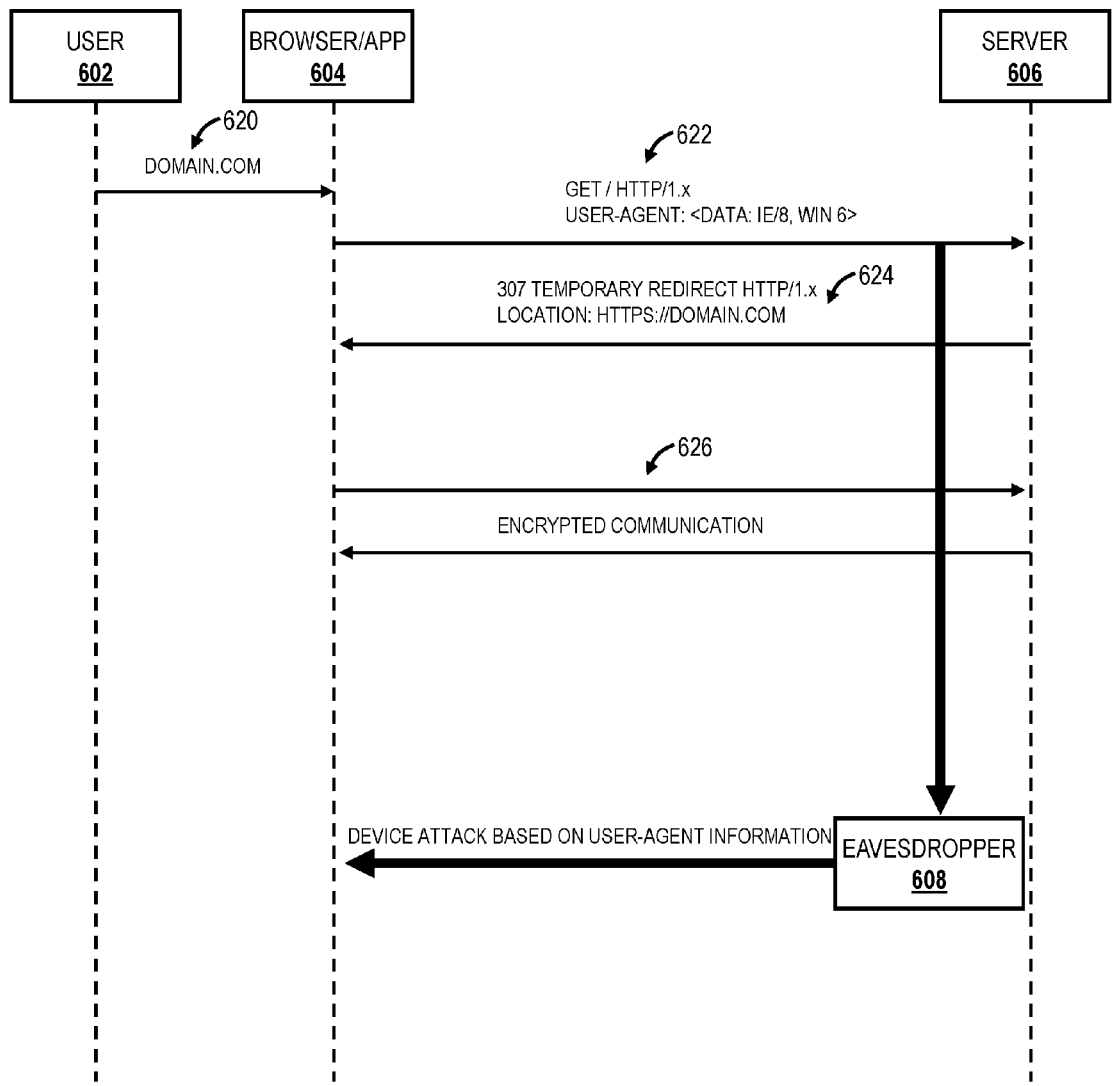
FIG. 8 is a network diagram of interactions between a user device, a browser/app on the user device, and a server associated with a requested domain illustrating User-Agent exposure.
Figure 9:
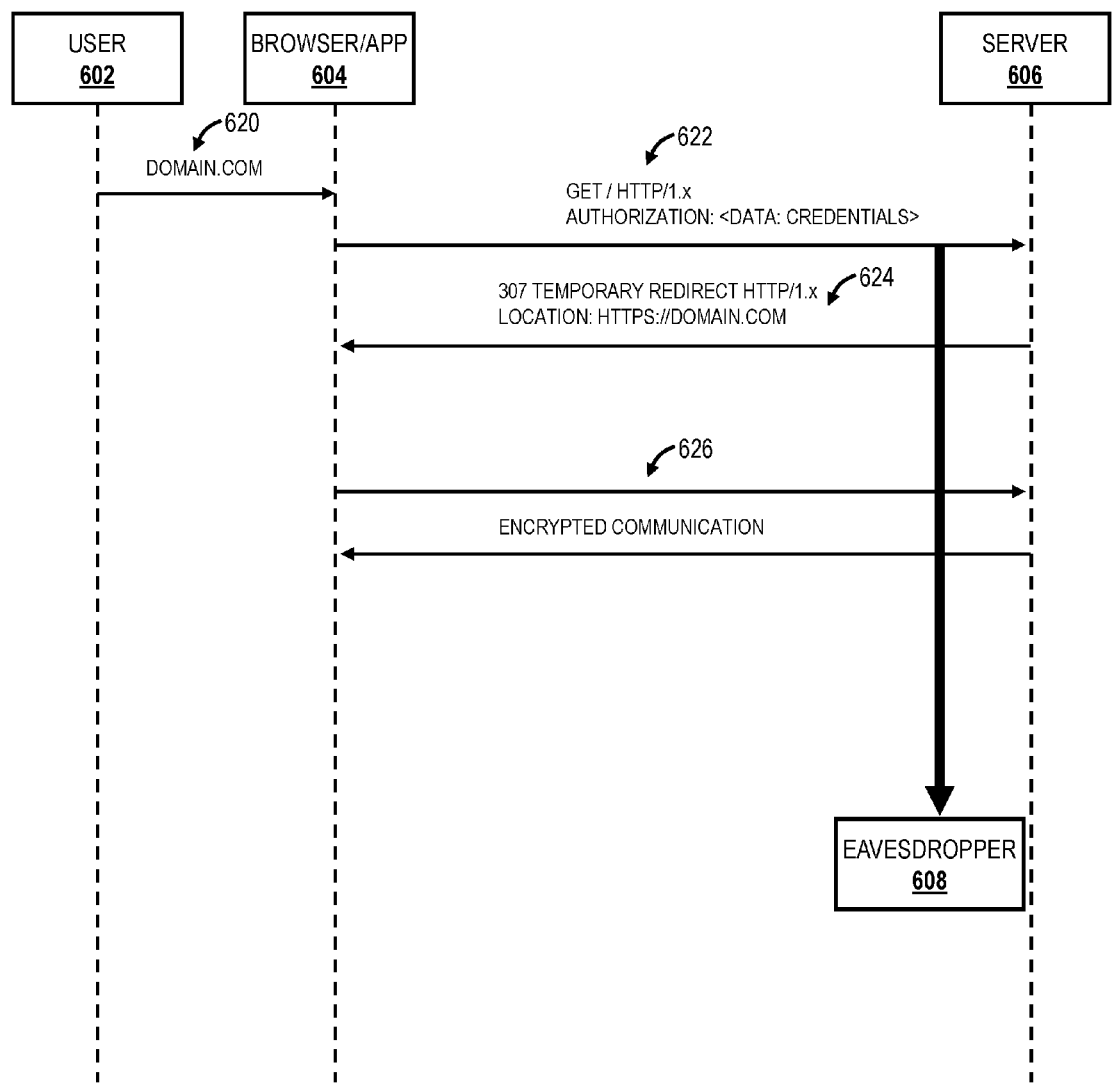
FIG. 9 is a network diagram of interactions between a user device, a browser/app on the user device, and a server associated with a requested domain illustrating Authorization exposure.

Referring to FIGS. 7-14, in various exemplary embodiments, flow diagrams illustrate interactions between a user device 602, a browser/app 604 on the user device 602, a server 606 associated with a requested domain, an eavesdropper 608, an HSTS application 610, and a cloud based proxy gateway 612 for implementing the systems and methods. FIG. 7 illustrates the interactions between the user device 602, the browser/app 604 on the user device 602, and the server 606 associated with a requested domain illustrating cookie hijacking. FIG. 8 illustrates the interactions between the user device 602, the browser/app 604 on the user device 602, and the server 606 associated with a requested domain illustrating User-Agent exposure. FIG. 9 illustrates the interactions between the user device 602, the browser/app 604 on the user device 602, and the server 606 associated with a requested domain illustrating Authorization exposure.

Figure 10:
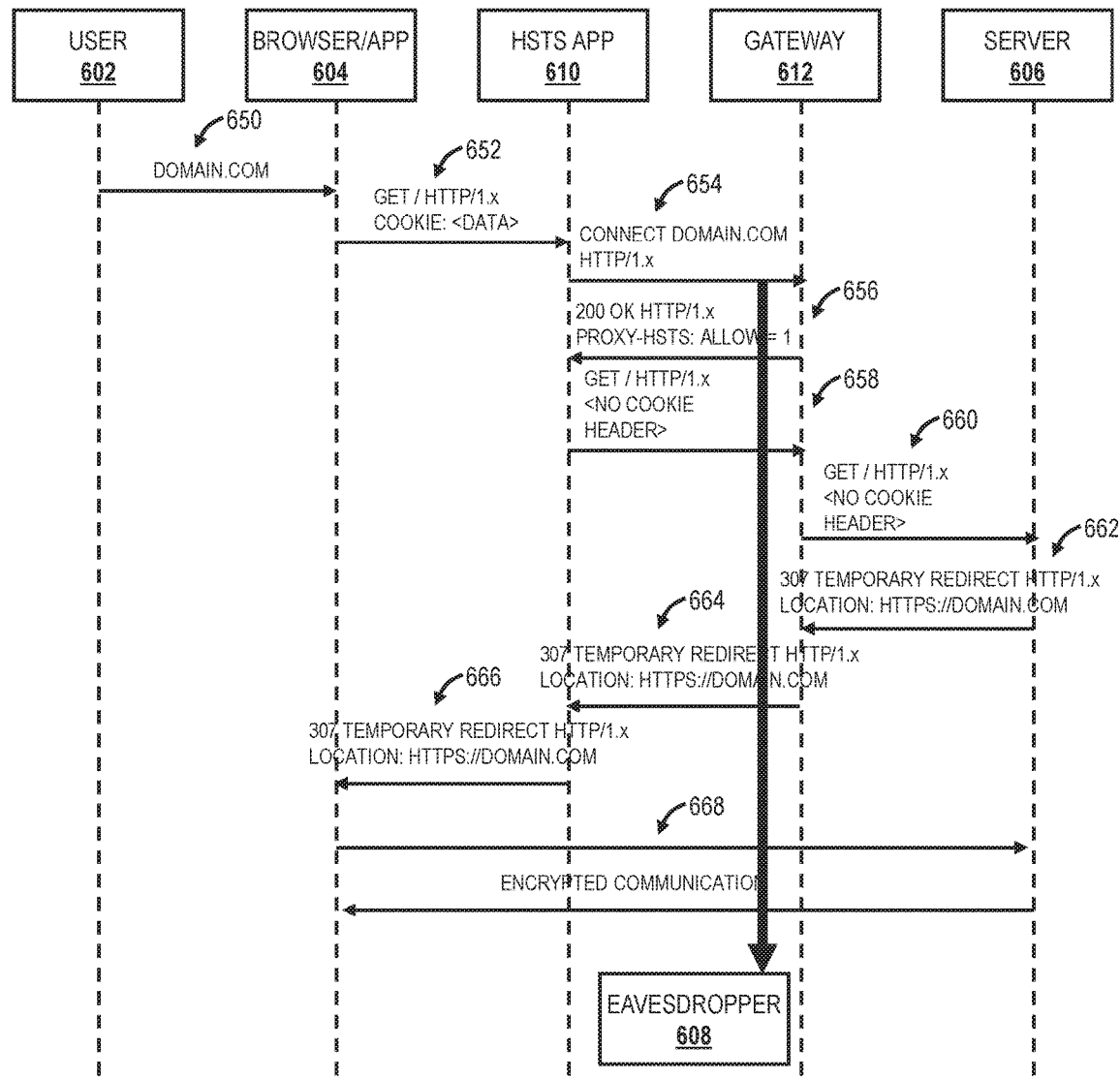
FIG. 10 is a network diagram of interactions between a user device, a browser/app on the user device, a server associated with a requested domain, an HSTS application, and a cloud based proxy gateway illustrating cookie security.
Figure 11:
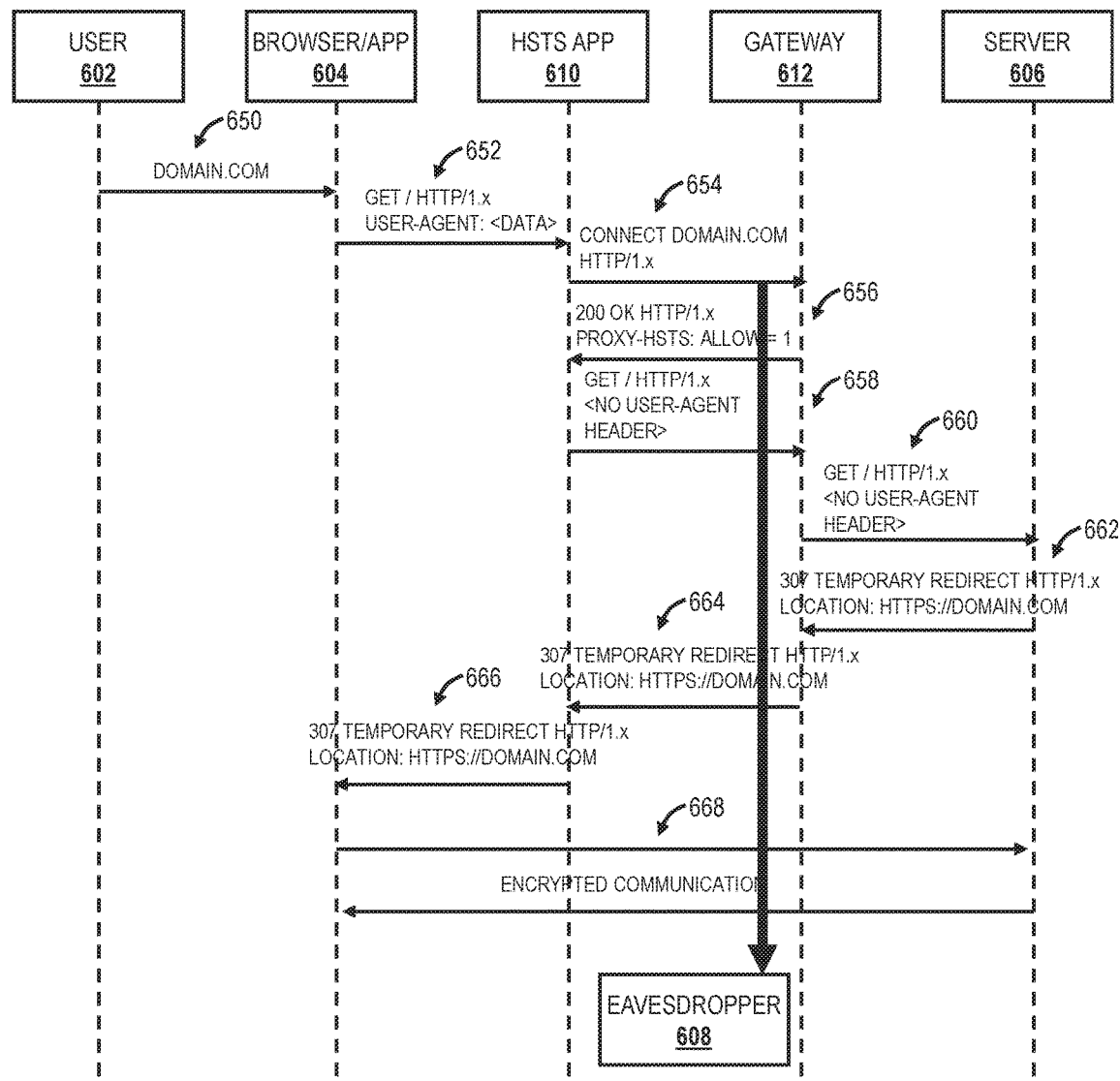
FIG. 11 is a network diagram of interactions between a user device, a browser/app on the user device, a server associated with a requested domain, an HSTS application, and a cloud based proxy gateway illustrating User-Agent security.
Figure 12:
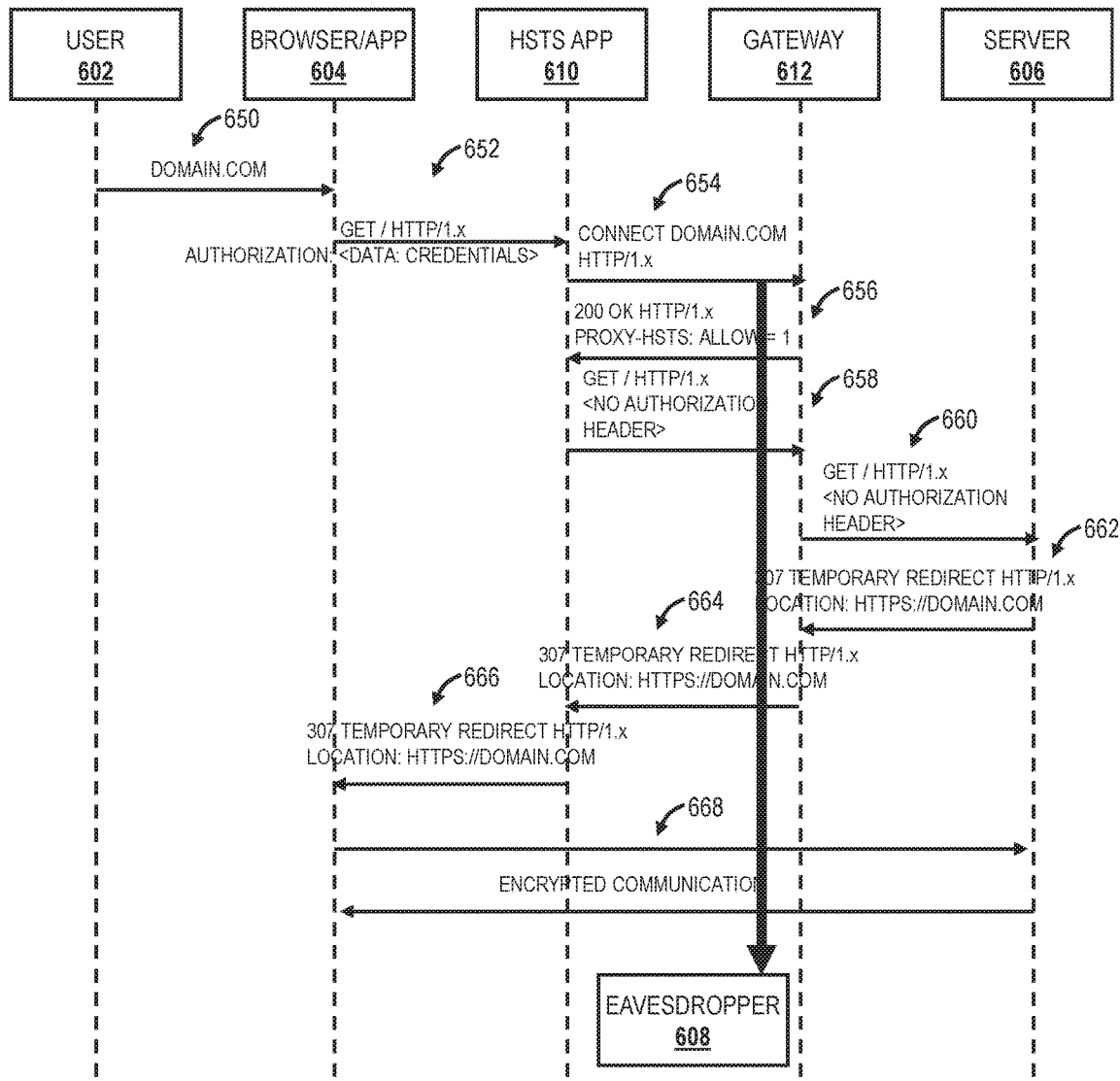
FIG. 12 is a network diagram of interactions between a user device, a browser/app on the user device, a server associated with a requested domain, an HSTS application, and a cloud based proxy gateway illustrating Authorization data security.
Figure 13:
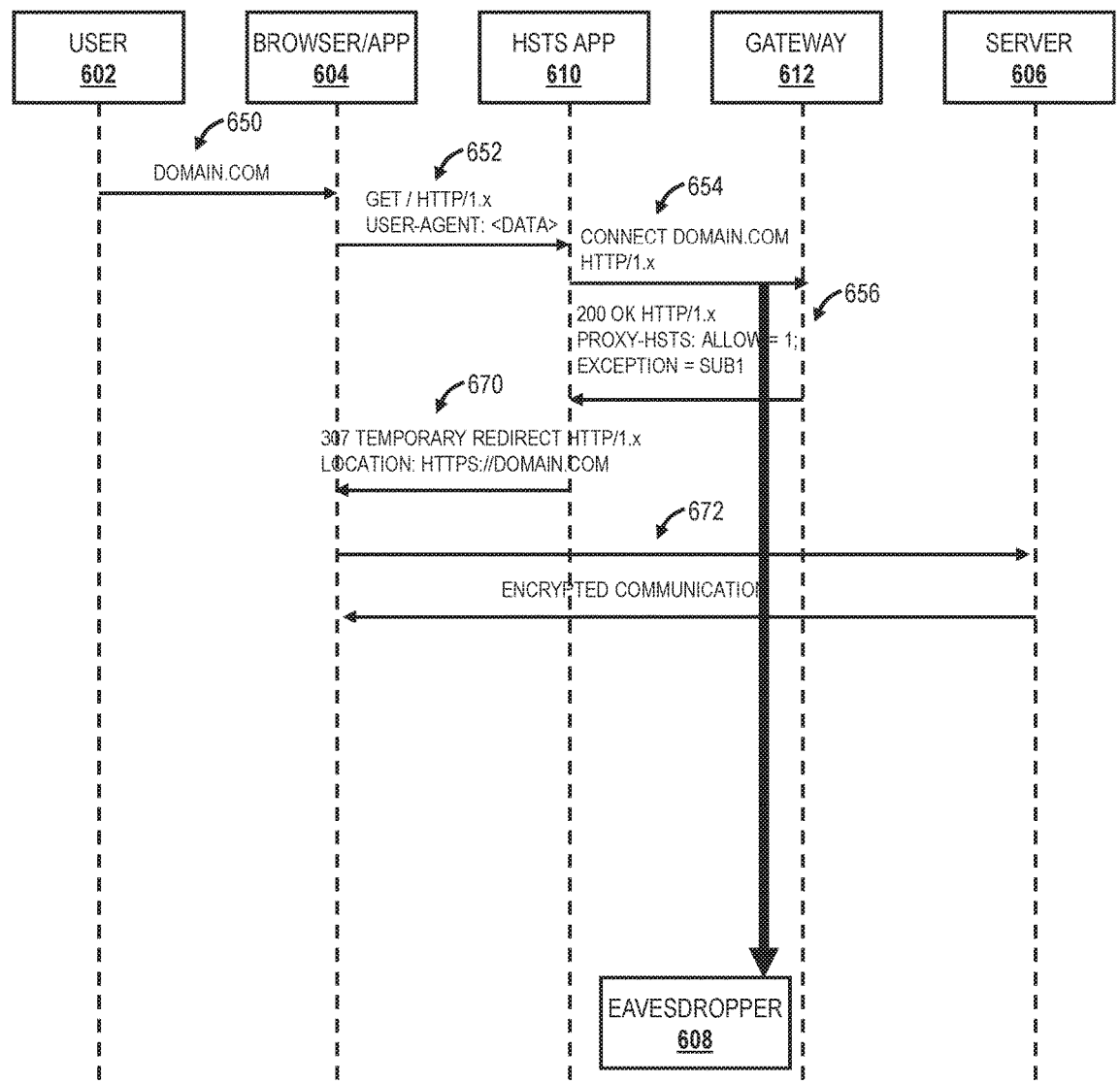
FIG. 13 is a network diagram of interactions between a user device, a browser/app on the user device, a server associated with a requested domain, an HSTS application, and a cloud based proxy gateway illustrating optimized cloud based HSTS.
Figure 14:
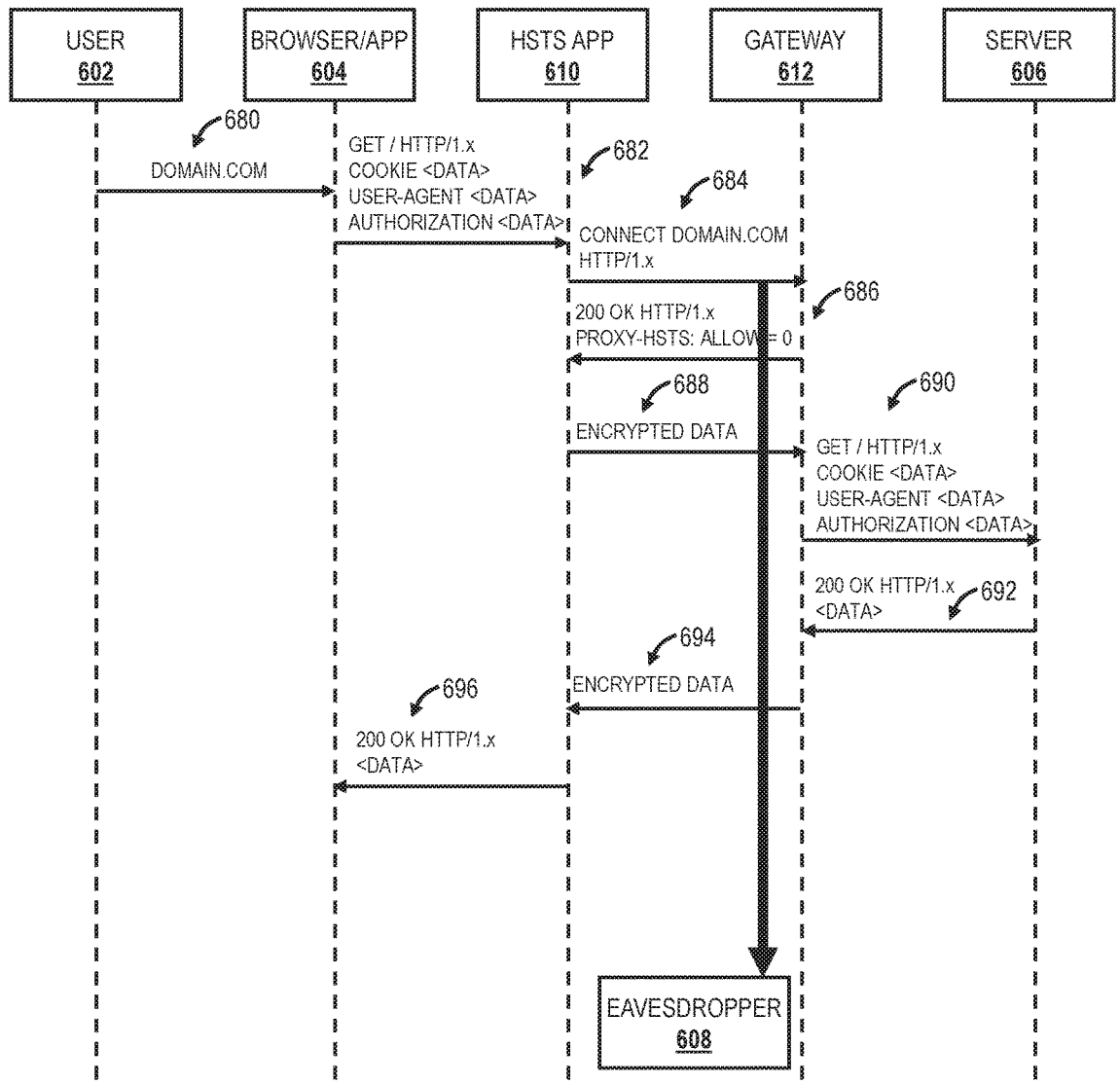
FIG. 14 is a network diagram of interactions between a user device, a browser/app on the user device, a server associated with a requested domain, an HSTS application, and a cloud based proxy gateway illustrating cloud based HSTS for non-HSTS domains.

FIG. 10 illustrates the interactions between the user device 602, the browser/app 604 on the user device 602, the server 606 associated with a requested domain, the HSTS application 610, and the cloud based proxy gateway 612 illustrating cookie security. FIG. 11 illustrates the interactions between the user device 602, the browser/app 604 on the user device 602, the server 606 associated with a requested domain, the HSTS application 610, and the cloud based proxy gateway 612 illustrating User-Agent security. FIG. 12 illustrates the interactions between the user device 602, the browser/app 604 on the user device 602, the server 606 associated with a requested domain, the HSTS application 610, and the cloud based proxy gateway 612 illustrating Authorization data security. FIG. 13 illustrates the interactions between the user device 602, the browser/app 604 on the user device 602, the server 606 associated with a requested domain, the HSTS application 610, and the cloud based proxy gateway 612 illustrating optimized cloud based HSTS. FIG. 14 illustrates the interactions between the user device 602, the browser/app 604 on the user device 602, the server 606 associated with a requested domain, the HSTS application 610, and the cloud based proxy gateway 612 illustrating cloud based HSTS for non-HSTS domains.

The user device 602 can be, for example, the computer device 220, the mobile device 230, the server 300, the mobile device 400, any of the devices in the locations 510, 520, 530, the mobile laptop 540, the mobile device 542, or the user device 554. The browser/app 604 can be any application, program, browser, etc. executed on the user device 602 and configured to communicate over a network using HyperText Transfer Protocol (HTTP) or HTTPS. The server 606 can be similar to the server 300 and is hosting a domain, such as domain.com as used in the various examples herein.

In FIGS. 7-9, as described herein, Internet users can simply type domain.com such as in a browser address bar or the like in the browser/app 604 on the user device 602 to make a request to the server 606 (step 620). The browser/app 604 makes an HTTP GET request to domain.com, i.e., the server 606 (step 622). In FIG. 7, the HTTP GET request can be GET/HTTP/1.x with COOKIE: <DATA>. In FIG. 8, the HTTP GET request can be GET/HTTP/1.x with USER-AGENT: <DATA: IE/8, WIN 6>. In FIG. 9, the HTTP GET request can be GET/HTTP/1.x with AUTHORIZATION: <DATA: CREDENTIALS>. As described herein, the COOKIE: <DATA>, USER-AGENT: <DATA: IE/8, WIN 6>, and the AUTHORIZATION: <DATA: CREDENTIALS> can be collectively referred to as sensitive information. FIGS. 7-9 illustrate three examples of sensitive information and those of ordinary skill in the art will recognize other types are also contemplated.

As described herein, the sensitive information is sent between the browser/app 604 to the server 606 as plain text, unencrypted. After step 622, the server 606 sends a 307 redirect to instruct the browser/app 604 to load an HTTPS version of domain.com (step 624). For example, this can include 307 TEMPORARY REDIRECT HTTP/1.x LOCATION: HTTPS://DOMAIN.COM. After the redirect, all communications between the browser/app 604 and the server 606 are encrypted (step 626). Until the 307 redirect, all communication is in plain text, and the eavesdropper 608 can listen to this information including the sensitive information for theft thereof.

The eavesdropper 608 is a malicious entity (the eavesdropper 608 is another computing device) which listens to the GET request and acquires the sensitive information. Cookies are used by most of the online services to authenticate and track user's personal details. User-Agent information has details about the browser/app 604 and operating system (OS) being used in the user device 602. This information can be used to attack the user device 602 using known issues with the browser/app 604 or OS or zero-day attacks. A zero-day vulnerability refers to a hole in the software that is unknown to the vendor. This security hole is then exploited by hackers or the eavesdropper 608 before the vendor becomes aware and hurries to fix it. For Authorization, the WWW-Authenticate mechanism is still being used by many servers to authenticate users. Once this information is exposed, it is very easy to gain access to user's account.

Again, a browser-based HSTS approach solves the aforementioned deficiencies in FIGS. 7-9 to some extent. Whenever the user types domain.com in a browser address bar in the browser/app 604, it is replaced with the https instead making this communication over HTTPS in step 622. With browser-based HSTS, every domain.com is matched against a pre-loaded list in the browser/app 604 to decide if it supports HTTPS. Again, not every variant of the browser/app 604 supports HSTS, the preloaded list of HTTPS domains has a limited number of domains, it is not possible to load billions of domains in the preloaded list, the preloaded list is stored on the user device 602 taking storage space, and to update the list, intrusive updates are required in the browser/app 604. Further, the preloaded list is created by humans, introducing human error and correcting an erroneous list is cumbersome.

§ 7.1 Cloud Based HSTS

In various exemplary embodiments, the systems and methods utilize a cloud based proxy to implement cloud based HSTS. Specifically, in FIGS. 10-13, there is an HSTS app 610 on the user device 602 in addition to the browser/app 604. The HSTS app 610 works to communicate with the gateway 612, securely, for the initial GET request. The gateway 612 implements cloud based HSTS on the GET request, thereby removing the requirement for the user device 602 or the browser/app 604 to implement HSTS along with the aforementioned limitations including local management of the preloaded list on the user device 602. The preloaded list is managed in the cloud based proxy gateway 612, and its update is instantaneous for all user devices 602 communicating through the gateway 612.

In FIGS. 10-12, the user, through the browser/app 604, requests a domain, domain.com (step 650). The browser/app 604 initiates an HTTP GET request to the server 606 (step 652). Again, as described in FIGS. 7-9, the HTTP GET request here in step 652 includes the sensitive information. In FIG. 10, the HTTP GET request can be GET/HTTP/1.x with COOKIE: <DATA>. In FIG. 11, the HTTP GET request can be GET/HTTP/1.x with USER-AGENT: <DATA: IE/8, WIN 6>. In FIG. 12, the HTTP GET request can be GET/HTTP/1.x with AUTHORIZATION: <DATA: CREDENTIALS>. As described herein, the COOKIE: <DATA>, USER-AGENT: <DATA: IE/8, WIN 6>, and the AUTHORIZATION: <DATA: CREDENTIALS> can be collectively referred to as sensitive information. FIGS. 10-13 illustrate three examples of sensitive information and those of ordinary skill in the art will recognize other types are also contemplated.

However, in FIGS. 10-12, with the cloud based proxy, the HSTS app 610 intercepts the HTTP GET request and communicates with the gateway 612, ensuring the sensitive information is not sent as plain text. For every domain, the HSTS app 610 makes a CONNECT request to the gateway 612 (step 654). For example, CONNECT domain.com HTTP/1.x. The gateway 612 responds to the HSTS app 610 with a proxy HSTS header along with other headers (step 656). For example, 200 OK HTTP/1.x PROXY-HSTS: ALLOW=1. Here, the gateway 612 determines the domain is allowed, and the header information includes information about the domain (the server 606) such as whether it supports HTTPS.

In FIGS. 10-12, it is assumed the domain (domain.com) through the server 606 supports HTTPS, and such information is communicated in step 656. If the domain.com supports HTTPS, the HSTS app 610 will remove all sensitive information from the first HTTP GET request in step 652 (step 658). The gateway 612 will forward the first HTTP GET request from the HSTS app 610 with the sensitive information removed to the server 606 (step 660). The server 606 responds with a 307 redirect to the gateway 612, such as 307 TEMPORARY REDIRECT HTTP/1.x LOCATION: HTTPS://DOMAIN.COM (step 662). The gateway 612 sends the 307 redirect to the HSTS app 610 (step 664), and the HSTS app 610 sends the 307 direct to the browser/app 604 (step 666). Subsequent to the browser/app 604 receiving the 307 redirect, all communication between the browser/app 604 and the server 606 is encrypted (step 668).

Thus, the cloud based proxy, through the gateway 612, can maintain the preloaded list and determine whether or not the domain, at the server 606, supports HTTPS. Management of the preloaded list is simplified as it occurs at a single location, in the cloud based proxy. The HSTS app 610 can perform the steps described herein for any domain request from any browser/app 604 associated with the user device 602.

§ 7.2 Optimizing Cloud Based HSTS

In FIG. 13, the CONNECT request frequency is reduced, thereby optimizing the cloud based HSTS. It is highly likely that if a domain supports HTTPS, then all sub-domains will support HTTPS. If a sub-domain does not support HTTPS, it can be added to an exception list associated with the preloaded list. In FIG. 13, the Proxy-HSTS header exchanged in step 656 can be extended to include sub-domain support for HTTPS, thereby optimizing the processes in FIGS. 10-12. For example, the step 656 can be 200 OK HTTP/1.x PROXY-HSTS: ALLOW=1; EXCEPTION=SUB1 which includes an example exception for SUB1 associated with the domain domain.com. The HSTS app 610 will not send CONNECT requests for sub-domains. Also, the HSTS app 610 can generate local 307 redirect once it sees an HSTS domain from the gateway 612 (step 670). This eliminates the need for the HTTP GET request to the server 606 in FIGS. 10-12. Subsequent to the browser/app 604 receiving the 307 redirect, all communication between the browser/app 604 and the server 606 is encrypted (step 672). Advantageously, this optimization in FIG. 13 where the HSTS app 610 generates the 307 redirect locally on the user device 602 based on the gateway 612 reduces network utilization and terminates all insecure connections on the user device 602 itself.

§ 7.2 Securing Non-HSTS Domains with the Cloud Based HSTS

In FIG. 14, non-HSTS domains (domains that do not support HTTPS) can be supported securely with the cloud based proxy supporting encrypted communication between the HSTS app 610 and the gateway 612. Here, the browser/app 604 initiates an HTTP GET request to the server 606 (step 680). Again, the HTTP GET request includes the sensitive information, and it is received by the HSTS app 610 (step 682). For every domain, the HSTS app 610 makes a CONNECT request to the gateway 612 (step 684). For example, CONNECT domain.com HTTP/1.x. The gateway 612 responds to the HSTS app 610 with a proxy HSTS header along with other headers (step 686). For example, 200 OK HTTP/1.x PROXY-HSTS: ALLOW=0. Here, the gateway 612 determines the domain is not allowed (it does not support HSTS) and the header information includes information about the domain (the server 606) such as whether it supports HTTPS.

Once the HSTS app 610 finds the domain does not support HTTPS from Proxy-HSTS header in step 686, the HSTS app 610 will send that domain's request over an encrypted channel to the gateway 612 (step 688). This protects against the eavesdropper 608 listening to the CONNECT request with plain text for the sensitive information. The gateway 612 can forward the HTTP GET request with the sensitive information to the domain, the server 606 (step 690). The server 606 can respond with a 200 OK HTTP/1.x <DATA> to the gateway 612 (step 692). The gateway 612 can send the response from the server 606 to the HSTS app 610 via an encrypted channel (step 694). The HSTS app 610 can provide the response, e.g., 200 OK HTTP/1.x <DATA> to the browser/app 604 (step 696).

Thus, non-HSTS domains can be secured from the eavesdropper 608 monitoring the user device 604. Here, the plain text communications of the sensitive information are between the gateway 612 and the server 606. This is advantageous over other approaches such as IPSec-like protocol.

§ 7.3 Cloud Based HSTS Benefits

Again, the cloud based HSTS provides HSTS for all browsers and apps, regardless of their underlying support. It is easy to add new domains supporting HSTS, by updating the preloaded list in the cloud based proxy. No updates are needed to the browser/app 604 to update HSTS supporting domain list, the preloaded list. Billions of domains can be added to a cloud in the preloaded list. There is no local storage of HSTS supporting domains on the user device 602. The cloud based proxy can auto-populate HSTS supporting domain list, the preloaded list, eliminating human involvement and associated efforts. Once an HSTS domain is added to the list, it takes effect instantly in the cloud based proxy. With optimization, the latency is reduced to zero or negative by generating a local 307 redirect. Double encryption is avoided for domains already supporting HTTPS, such double encryption with other techniques. There are improvements in battery life at the user device 602 by reducing overall encryption processing needed. Thus, the cloud based HSTS solves the deficiencies described herein with conventional HSTS approaches. The cloud based HSTS is less cumbersome and no overhead of updates. Finally, the cloud based HSTS guarantees secure and accurate implementation of HSTS.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for HyperText Transfer Protocol (HTTP) HTTP Strict Transport Security (HSTS), implemented by one or more servers associated with a gateway in a cloud based proxy, the method comprising:
   managing a preloaded list of HTTP Security (HTTPS) support of a plurality of domains;
   receiving a domain request from an HSTS application executed on a user device, wherein the HSTS application is configured to detect the domain request from a browser or application executed on the user device; and
   transmitting a response to the user device with header information related to support of HTTPS the domain.

2. The method of claim 1, further comprising:
   subsequent to the receiving and prior to the transmitting, determining the support of HTTPS of the domain.

3. The method of claim 2, wherein the determining comprises:
   sending a request to the domain without sensitive information from the domain request; and
   receiving a redirect from the domain.

4. The method of claim 2, wherein the determining comprises checking the preloaded list and wherein the header information comprises any exceptions based on the preloaded list.

5. The method of claim 1, wherein the HSTS application removes sensitive information from the domain request prior to the receiving.

6. The method of claim 1, wherein communications between the user device and the gateway are secure.

7. The method of claim 6, wherein the domain does not support HSTS, and further comprising:
transmitting the domain request with sensitive information in plain text between the gateway and the domain.

8. A gateway in a cloud based proxy, configured to implement HyperText Transfer Protocol (HTTP) HTTP Strict Transport Security (HSTS), the gateway comprising:
a network interface, a data store, and a processor communicatively coupled to one another; and
memory storing computer executable instructions, and in response to execution by the processor, the computer-executable instructions cause the processor to perform steps of
managing a preloaded list of HTTP Security (HTTPS) support of a plurality of domains;
receiving a domain request from an HSTS application executed on a user device, wherein the HSTS application is configured to detect the domain request from a browser or application executed on the user device; and
transmitting a response to the user device with header information related to support of HTTPS the domain.

9. The gateway of claim 8, wherein the memory storing computer executable instructions, and in response to execution by the processor, the computer-executable instructions further cause the processor to perform steps of
subsequent to the receiving and prior to the transmitting, determining the support of HTTPS of the domain.

10. The gateway of claim 9, wherein the determining comprises:
sending a request to the domain without sensitive information from the domain request; and
receiving a redirect from the domain.

11. The gateway of claim 9, wherein the determining comprises checking the preloaded list and wherein the header information comprises any exceptions based on the preloaded list.

12. The gateway of claim 8, wherein the HSTS application removes sensitive information from the domain request prior to the receiving.

13. The gateway of claim 8, wherein communications between the user device and the gateway are secure.

14. The gateway of claim 13, wherein the domain does not support HSTS, and wherein the memory storing computer executable instructions, and in response to execution by the processor, the computer-executable instructions further cause the processor to perform steps of
transmitting the domain request with sensitive information in plain text between the gateway and the domain.

15. A method for HyperText Transfer Protocol (HTTP) HTTP Strict Transport Security (HSTS), implemented by a user device in communication with a gateway in a cloud based proxy, the method comprising:
detecting a domain request from a browser or application executed on the user device by an HSTS application on the user device;
securely forwarding the domain request to a gateway;
receiving a response from the gateway with header information related to HTTP Security (HTTPS) support of the domain; and
responsive to the domain supporting HTTPS based on the header information, securely communicating with the domain.

16. The method of claim 15, wherein the browser or application does not support HSTS.

17. The method of claim 15, wherein the HSTS application removes sensitive information from the domain request prior to the forwarding.

18. The method of claim 15, wherein the gateway determines whether the domain supports HTTPS independent of the user device.

19. The method of claim 18, wherein the gateway determines through a request sent to the domain without sensitive information from the domain request; and reception of a redirect from the domain.

20. The method of claim 18, wherein the gateway determines by checking a preloaded list managed thereon of HTTPS supporting domains and wherein the header information comprises any exceptions based on the preloaded list.

* * * * *